Patented Dec. 24, 1929

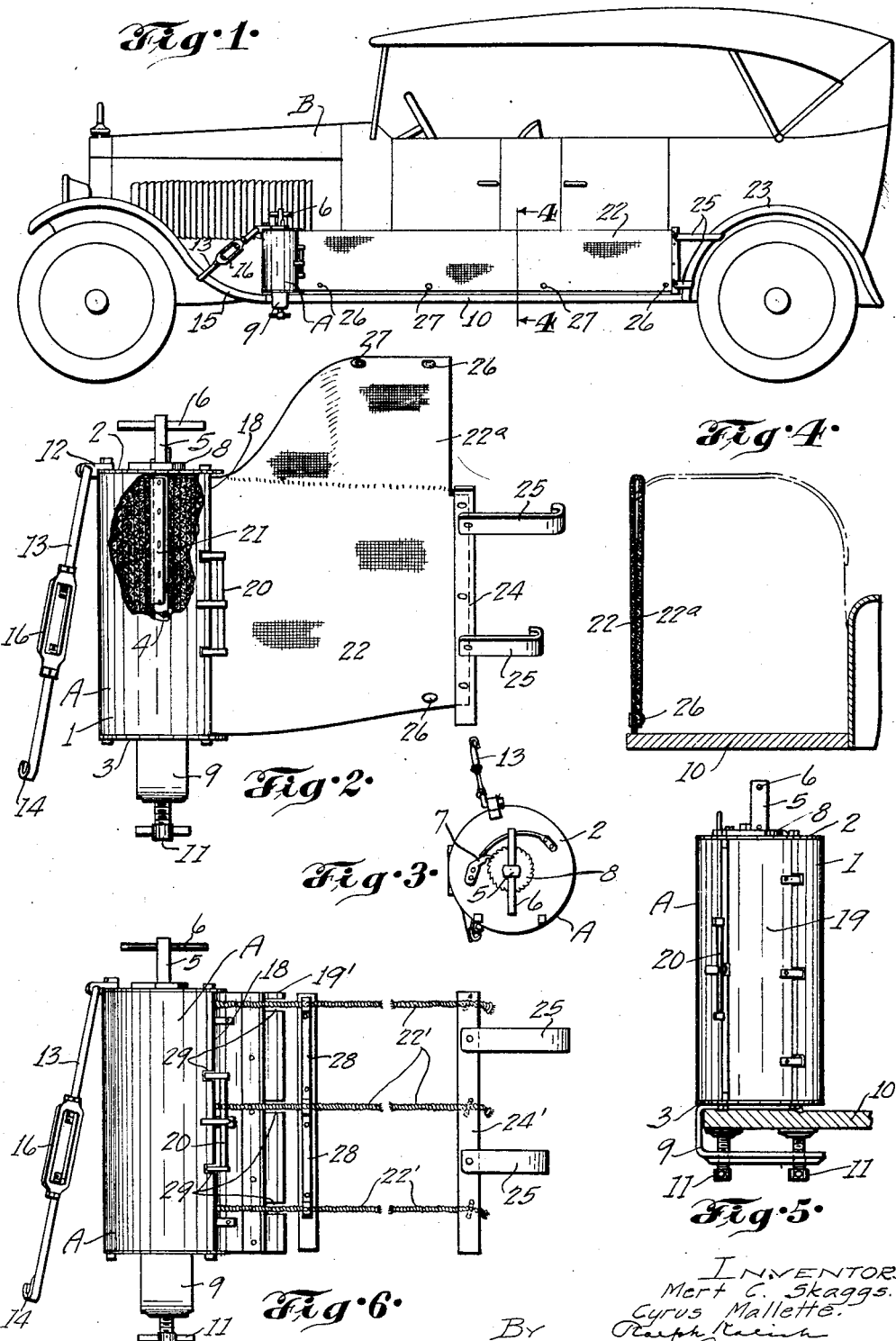

1,740,670

UNITED STATES PATENT OFFICE

MERT C. SKAGGS AND CYRUS MALLETTE, OF CROCKER, MISSOURI

LUGGAGE RETAINER

Application filed January 30, 1928. Serial No. 250,464.

This invention relates generally to luggage-retainers and, more particularly, to a certain new and useful improvement in luggage-retainers of the type that are adapted, as an accessory, for attachment to, and for co-operation with the running-board of, an automobile.

Our invention has, among its objects, the provision of a luggage-retainer of the type stated which is of economical, durable structure, which may be readily and easily operatively mounted detachably on the automobile, which, when not in use and detached from the automobile, may compactly be conveniently carried under a seat or otherwise within the automobile, and which is efficient in the performance of its intended functions.

And with the above and other objects in view, our invention resides in the novel features of form, construction, arrangement, and combination of parts hereinafter described and pointed out in the claim.

In the accompanying drawing,

Figure 1 is an elevational view of an automobile equipped with a luggage-retainer of our invention, the retainer being shown as operatively mounted upon the automobile and its flexible wall extended as when in use;

Figure 2 is an enlarged, broken, elevational view of the retainer with its flexible wall party extended;

Figure 3 is a plan view of the wall-housing shell of the retainer;

Figure 4 is an enlarged detail section taken approximately on the line 4—4, Figure 1;

Figure 5 is an elevational view of the shell of the retainer, with the wall of the retainer fully housed therein; and Figure 6 is an elevational view, with its wall partly extended, of a slightly modified form of retainer embodying our invention.

Referring now more in detail and by reference characters to the drawing, which illustrates practical embodiments of our invention, the retainer comprises a casing or shell A constructed preferably of suitable, rigid, light-weight metal and which includes a preferably cylindrical main wall 1 and disk-shaped top and bottom walls 2 and 3, respectively, welded or otherwise permanently fixed together. Supported as by a step-bearing or the like (not shown), for rotatory movement, within shell A, is a longitudinally disposed shaft 4 whose upper end 5 extends outwardly of the shell through its top wall 2 and is equipped with a suitable turning bar or handle 6. Pivoted on the shell top wall 2, is a spring-pressed dog or pawl 7 for engagement, for purposes shortly appearing, with a ratchet-wheel 8 fixed to the shaft-end 5, as best seen in Figures 2 and 3.

Rigidly fixed to the shell bottom wall 3, is a U-shaped bracket 9 adapted to straddle the running board 10 of the automobile, as seen in Figure 5, threaded for adjustment in one leg of which bracket are suitable screw-members 11 adapted for engagement with the running-board 10 in detachably securing the retainer operatively upon the particular automobile B; and pivotally connected at one end, as at 12, to the upper end of shell A, is a brace 13 provided at its other or free end with a hook 14 for detachably shell-bracing engagement with the front fender 15 of the automobile B, as seen in Figure 1, brace 13 preferably including, and being lengthwise adjustable by means of, a turn-buckle 16 to facilitate engagement of the brace 13 with the fender 15. Formed in the main shell-wall 1, is an opening, as at 18, having a closure in the form of a hinged door 19 adapted to be fastened in closed position by a spring-catch or the like 20.

Suitably fixed or attached at an end, as at 21, to the shaft 4, is the luggage-retaining wall 22, which, in the preferred form of our retainer, is in the form of a strip of canvas or other similar or analogous flexible material having a length to operatively extend from adjacent the front fender 15 to adjacent the rear fender 23 of the automobile, strip or wall 22 at its free end having suitably fixed thereto a transversely disposed metallic re-enforcing plate 24, rigidly projecting from which in preferably spaced relation, as best seen in Figure 2, are hook-members 25 for securing the wall 22, when operatively extended in luggage retaining relation to the automobile B and its running-board 10, detachably to the rear fender 23, as illustrated in Figure 1.

The retainer being so constructed and detachably engaged with the automobile, its wall 22 operatively extends in vertically disposed relation along or adjacent the outer edge of the running-board 10 and functions efficiently in retaining on the running-board luggage or the like placed thereon.

The wall 22 proper has a width or height substantially the same as the height of its housing-shell A. However, as additional retaining, as well as protecting, means for such luggage, the strip 22 throughout the greater part of its length has a width or height substantially twice the height of the shell A and is normally doubled upon itself, as seen in full lines in Figure 4, the inner flap or extension 22$^a$ at its free edge being detachably secured to the main flap or wall 22 by means of glove or snap-couplets or the like 26, whereby the inner or extension flap 22$^a$ may be readily disengaged at its free edge from the wall 22 and spread as a protecting cover over the interposed or carried luggage, as indicated in dot-and-dash lines in Figure 4. As best seen in Figure 1, the wall 22 and its extension 22$^a$ are preferably provided along their one or lower edge with a series of spaced openings 27 to accommodate the passage of ropes or the like, not shown, for securing, if desired, the flap 22$^a$ over or around the carried luggage.

On disengaging the hooks 25 and pawl 7 being held out of engagement with its cooperating ratchet 8, the wall 22, with its flap or extension 22$^a$ in folded relation, may, on turning movement being imparted to shaft 4 by its handle 6, be rolled up upon the shaft 4 to reside inoperatively within the shell A, when shell A, with its door 19 closed, may be readily detached from the automobile and forms a compact package occupying small space which may be conveniently carried within the automobile.

In the modified form of the retainer illustrated in Figure 6, we substitute, as and for the preferred retaining wall 22, a retaining wall formed of a plurality of ropes or light cables 22′ disposed in spaced parallel relation and similarly fixed at one end to the shaft 4 and provided at their other or free end with a plate 24′ similarly equipped with fender engaging-hooks 25. Preferably also the several ropes 22′ are held in spaced relation at suitable points along their length by spacing-bars 28, and to permit of the door 19′ being closed when the wall 22′ is operatively extended, the door 19′, to accommodate the several ropes 22′, is provided preferably with correspondingly spaced individual slots 29.

Our luggage-retainer, as thus described, may be easily attached upon, and detached from, the automobile, may be inexpensively constructed, is conveniently operable, and is satisfactory and efficient in use.

We are aware that changes in the form, construction, arrangement, and combination of the several parts of our new luggage retainer may be made and substituted for those herein shown and described without departing from the nature and principle of our invention.

Having thus described our invention, what we claim and desire to secure by Letters Patent is:

In a luggage-retainer, a strip of flexible canvas, said strip being adapted to operatively extend vertically along the running-board of an automobile, a strip-housing shell, means having connection with the shell and with an end of the strip for winding the strip to inoperatively reside within the shell, means for detachably securing the shell to the automobile, a hook on the free end of the strip for detachably engaging the automobile when the strip is in operative position, and a foldable flap-extension on the strip adapted for projection over the retained luggage when the strip is in operative position.

In testimony whereof, we have signed our names to this specification.

MERT C. SKAGGS.
CYRUS MALLETTE.